United States Patent [19]

Claypool et al.

[11] Patent Number: 5,028,769
[45] Date of Patent: Jul. 2, 1991

[54] DEVICE FOR READING A MOLD CODE ON A GLASS BOTTLE

[75] Inventors: Mark P. Claypool; Gary C. Weber; Timothy W. Shay, all of Horseheads, N.Y.; Paul F. Scott, Hartford, Conn.

[73] Assignee: Emhart Industries, Inc., Towson, Md.

[21] Appl. No.: 481,714

[22] Filed: Feb. 15, 1990

Related U.S. Application Data

[63] Continuation of Ser. No. 287,606, Dec. 16, 1988, abandoned, which is a continuation of Ser. No. 898,279, Aug. 20, 1986, abandoned.

[51] Int. Cl.$^5$ .......................... G06K 7/10; G06K 7/01
[52] U.S. Cl. ..................................... 235/454; 235/462; 235/473; 250/223 B; 250/227.28; 250/227.29
[58] Field of Search ............... 235/375, 383, 385, 435, 235/439, 440, 454, 456, 461, 462, 473, 490, 494; 369/112; 250/223 B, 227.2, 227.24, 227.26, 227.28, 227.29, 555, 578.1, 566-570

[56] References Cited

U.S. PATENT DOCUMENTS

| | | | |
|---|---|---|---|
| 3,255,357 | 6/1966 | Kapany et al. | 250/227 |
| 3,327,584 | 6/1967 | Kissinger | 250/227 |
| 3,453,440 | 7/1969 | Muir et al. | 250/227 |
| 3,639,067 | 2/1972 | Stephens | 250/223 B |
| 3,918,028 | 11/1975 | Humphrey et al. | 235/473 |
| 3,923,158 | 12/1975 | Fornaa | 235/454 |
| 3,953,730 | 4/1976 | Henry et al. | 235/473 |
| 3,991,883 | 11/1976 | Hobler et al. | 250/223 B |
| 4,013,893 | 3/1977 | Hertig | 235/462 |
| 4,056,712 | 11/1977 | Trenkamp et al. | 235/473 |
| 4,070,584 | 1/1978 | Chartraire et al. | 250/555 |
| 4,201,338 | 5/1980 | Keller | 235/454 |
| 4,259,569 | 3/1981 | Passer et al. | 235/494 |
| 4,283,622 | 8/1981 | Passer et al. | 235/473 |
| 4,379,225 | 4/1983 | Apothaker | 250/227 |
| 4,488,648 | 12/1984 | Claypool | 250/223 B |
| 4,524,270 | 6/1985 | Martin | 235/494 |
| 4,625,101 | 11/1986 | Hinks et al. | 235/490 |
| 4,638,170 | 1/1987 | Kubota | 235/473 |
| 4,644,151 | 2/1987 | Juvinall | 235/494 |
| 4,672,200 | 6/1987 | Claypool et al. | 250/227 |
| 4,680,457 | 7/1987 | Robertson | 235/463 |
| 4,707,600 | 11/1987 | Nakao et al. | 250/227 |
| 4,713,536 | 12/1987 | Williams et al. | 250/223 B |
| 4,751,375 | 6/1988 | Ravizza | 235/472 |

Primary Examiner—Stuart S. Levy
Assistant Examiner—Robert Weinhardt
Attorney, Agent, or Firm—Spencer T. Smith

[57] ABSTRACT

Apparatus for reading code elements which are relieved from a container. A source of light projects normally at the code elements while the container is rotated to sequentially illuminate each of the code elements. A sensor receives light which is reflected approximately normal to the surface of the container but avoids light which is reflected from the surface of each code element at an appreciable angle relative to the normal. The intensity of the reflections from regions of said container not containing a code element are relatively large compared to reflections received from portions of the container surface containing a code element and a threshold is set therebetween.

3 Claims, 7 Drawing Sheets

FIG.5a

FIG.5b LPF

FIG.5c DIFF.

FIG.5d SCHIDT TRIGGER

DEVICE FOR READING A MOLD CODE ON A GLASS BOTTLE

This is a continuation of co-pending application Ser. No. 287,606 filed on Dec. 16, 1988 and original application Ser. No. 898,279 filed Aug. 20, 1986 both now abandoned.

BACKGROUND OF THE INVENTION

The invention relates generally to apparatus for reading codes on containers and deals more particularly with apparatus for optically reading relieved code elements.

Codes are widely used today on various products to provide source, pricing and other information about the product. For example, in the bottle making industry, bottles are often formed by a multiple section forming machine, and a code is molded into each bottle indicating the section in which the bottle was formed. In the event that a particular mold produces defective bottles, the defective bottles can be detected by inspection apparatus and the mold code of the defective bottles read to determine the source of the defective bottles. At which time, the defective mold may be replaced.

The molded code may take various forms such as a bar code, a dot code or a ring code, which bars, dots or rings may protrude from the bottle sidewall or bottom surface. In U.S. Pat. No. 4,524,270 to Martin, a bar code reader is disclosed. The U.S. Pat. No. 4,524,270 issued June 18, 1985 is assigned to the assignee of the present invention and is hereby incorporated by reference as part of the present disclosure. The 4,524,270 optical reading head is positioned at the level of the code. Each of the bar code elements protrudes from and is skew relative to the surface of the surrounding region of the sidewall and the bottle is rotated to sequentially expose each bar code element to the scanning head. The scanning head comprises a source of light aimed at the level of the code, a linear array of optical receiving fibers, a lens assembly positioned to receive light reflected from the code elements and focus the light onto the linear array of optical fibers and a series of photosensitive diodes associated with each of the optical fibers, respectively. When each bar passes in front of the scanning head, light reflects from the surface of the bar through the lens assembly and into one or more of the receiving optical fibers to indicate the presence and length of the bar. When a region of the sidewall surface is exposed to the scanning head and no code elements are present, then the light source illuminates the sidewall and the light is reflected away from the lens assembly and no diodes are activated.

It has proven difficult in practice to produce the code elements with enough precision and to align the code elements with the lens assembly and receiver fibers with enough accuracy to ensure that light reflected from the reflective surface of each code element actually reflects through the lens assembly and into the linear array of receiver optical fibers. Without such precision and alignment, it is difficult to detect the bar code elements. In addition, occasionally the scanning head, even when properly aligned with a code element, detects reflections from a back side of the bar code element, a so-called "phantom" reflection, which further complicates the code reading process.

Dot code elements take various forms such as rounded wedges as disclosed in U.S. Pat. No. 3,991,883 to Hobler et al, which patent is hereby incorporated by reference as part of the present disclosure, and raised hemispherical "bumps". In the past, such codes have been detected by projecting light onto each dot in sequence and positioning a photodetector to receive a reflection from the dot in a similar manner to the detection of bars discussed above.

U.S. Pat. No. 4,201,338 to Keller discloses a dot code formation having two parallel, linear patterns of dots. One pattern comprises equally spaced dots and serves as timing marks, and the other pattern contains dots aligned with some of the timing dots and contains the actual binary information of the code. The 4,201,338 patent also discloses a light source positioned to transmit light horizontally approximately tangent to a container sidewall, and a photodetector positioned to receive light reflected at approximately 70° relative to the angle of the incident light, which photodetector is positioned approximately normal to the tangent point. The positioning of the photodetector corresponds to the angle of light reflected from the dots.

Another previously known dot formation has a single linear pattern of dots, two dots at the beginning spaced by a standard amount, two dots at the end spaced by a standard amount and five other dots between the beginning and end pairs of dots. Between the beginning and end pairs of dots is a linear distance sufficient to contain nine dots based on the aforesaid standard spacing. The dots at the beginning and end serve to frame the code, and the location of the five intermediary dots provides the actual information.

Accordingly, a general object of the present invention is to provide an apparatus for reading molded and other relieved code elements, which apparatus does not require precise alignment with the code elements or strict manufacture tolerances in the code elements.

SUMMARY OF THE INVENTION

The invention resides in an apparatus for reading code elements of a code on a container. Each of the code elements is relieved from the container and has a surface which is appreciably skewed relative to an adjacent surface region of said container. The apparatus is used with a mechanical means which moves the carrier such that the code elements are sequentially positioned for reading by said apparatus. The apparatus comprises an illumination means for projecting light approximately normal to the surface of the carrier at a level corresponding to the code elements so that the light illuminates each code element during the movement of said carrier. A sensing means is positioned to receive the light which is reflected approximately normal to the surface of the carrier while avoiding the light which is reflected at an appreciable angle relative to the normal. The sensing means produces a first output signal having a magnitude corresponding to a relatively large amount of light reflected from a region of said container which does not contain a code element and a second output signal having a magnitude corresponding to a relatively small amount of light reflected from a region of said carrier which contains a code element. According to one feature of the invention, a comparator compares the intensity of the reflected light to a threshold corresponding to a level between said relatively large amount of light and said relatively small amount of light. According to another feature of the invention, the illumination means comprises a plurality of first optical fibers having adjacent first ends supported to project light approximately normally toward said carrier and the sensor means comprises a plurality of second optical fibers having adjacent ends intermingled with the light projecting ends of the first optical fibers.

According to still another feature of the invention, the sensor means comprises a plurality of third optical fibers having adjacent ends intermingled with the projecting ends of first optical fibers, the projecting ends of the first optical fibers being arranged in an elongated pattern, the adjacent ends of the second optical fibers being positioned over a longitudinal portion of the elongated pattern and the adjacent ends of the third optical fibers being arranged over a different longitudinal portion of the elongated pattern so that the second optical fibers aim at shorter bar code elements of a bar code and bottom portions of longer bar code elements of the code and the third optical fibers aim at upper portions of the longer bar code elements and regions of said container surface adjacent to and aligned with the shorter bar code elements.

The invention also resides in an apparatus for reading code elements in which an illumination means projects light toward a region on a container at the level of a code at an angle relative to the container radius at the region and a sensor means is positioned at twice the aforesaid angle relative to the angle of the projected light so that when no code element is in the region, light projected by the illumination means naturally reflects from the container sidewall toward the sensor means. Conversely, when a code element is located within the region, the light projected by the illumination means is scattered by the code element at an appreciable angle relative to the location of the sensor means so that relatively little of the projected light is received by the sensor means and this absence of light indicates the presence of a code element.

The invention also resides in related processes.

BRIEF DESCRIPTION OF THE FIGURES

The accompanying drawings show, by way of example, apparatus in accordance with the invention.

FIGS. 5(a–d) illustrate various wave forms produced by the circuitry of the electronic control of FIG. 2(a) in relation to the code elements of the code on the container of FIG. 1.

FIGS. 10(a–e) illustrate various wave forms developed by the electronic control of FIG. 7 after various stages of processing in relation to the code elements of the code of FIG. 6.

DETAILED DESCRIPTION OF THE PREFERRED EMBODIMENTS

Figures 1, 2A:
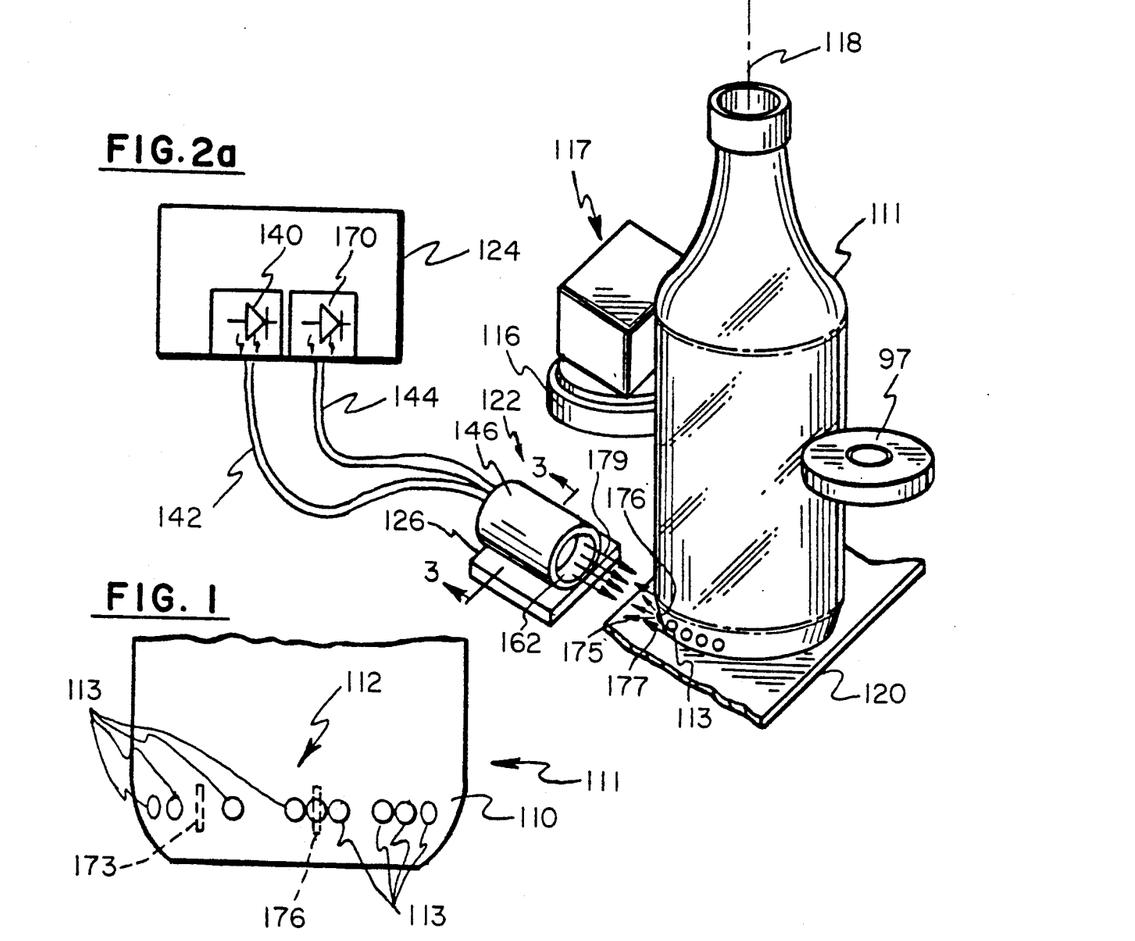
FIG. 1 is a side elevational view of the lower part of a glass container with a dot code protruding from the sidewall of the container.
FIG. 2(a) shows a schematic view of a scanning head and an associated electronic control for reading the dot code of FIG. 1, and a side elevational view of the glass container of FIG. 1 turned 90° about its axis to expose a code element to the scanning head.

Turning now to the drawings, FIG. 1 illustrates the lower or heel portion of a glass bottle 111 having a dot code 112 molded into a sidewall 110. By way of example, the bottle 111 was made in a multiple section glassware forming machine and the dot code indicates the mold in which the associated bottle was made. The dot code 112 is the type described above which includes two dots 113, 113 at the beginning of the code, two dots 113, 113 at the end to frame the code and five dots 113, 113 located in between the beginning and end dots to provide the actual code information. All of the dots 113, 113 are situated at approximately the same vertical level. As illustrated in FIG. 2(a) by the side view of the dot 113, each of the dots protrudes from the sidewall 110 in the form of a hemispherical "bump" although it should be clearly understood that a wide range of shapes and types of code elements may be read by the present invention, but preferably each of the code elements has a surface portion which is non-perpendicularly angled or skewed relative to the adjacent sidewall.

FIG. 2(a) also illustrates a belt 116 which is part of a motor and pulley assembly 117 and a pair of wheels 97, 97 to counter the belt, for rotating the bottle 118 while being supported on a plate 120 (or a conveyor surface) at an inspection site. FIG. 2(a) further illustrates an optical scanning head 122 and an associated electronic control 124 for reading the dot code 112. The scanning head 122 is supported by a bracket 126 to aim normally (perpendicularly) toward the heel portion of the bottle 111 containing the code 112, and as the bottle 111 is rotated, each code element 113 in sequence passes in front of the optical scanning head 122 and other regions of the sidewall 110 which do not contain a code element also pass in front of the scanning head.

Figure 3:
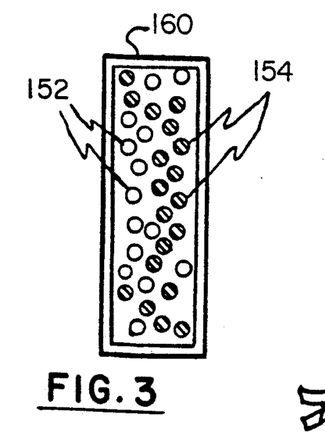
FIG. 3 is a cross-sectional view of the scanning head of FIG. 2(a) along the plane 3—3 and illustrates sender and receiver optical fibers within the scanning head.

The optical scanning head 122 comprises a sender fiber optic bundle 142 and a receiver fiber optic bundle 144 which merge together within a housing 146. As illustrated in FIG. 3, optical fibers 152, 152 of the sender bundle 142 are randomly intermingled with optical fibers 154, 154 of the receiver bundle 144 and, the ends of the fibers 152, 154 within the housing 146 are approximately parallel to each other. The optical fibers 152, 154 are constrained within a rim 160 and by way of example, the rim has an inner length of 0.154 inches and an inner width of 0.02 inches, the diameter of each fiber is 0.001 inches and the diameter of each dot is approximately 0.05 inches. The sender bundle 142 projects a correspondingly shaped, composite rectangular beam of light 173 or 176 onto the container (FIG. 1). The width of the beam is less than the center spacing between adjacent dots, and preferably less than or equal to the sidewall spacing between two adjacent dots.

A high intensity light emitting diode (LED) 140 transmits light into one end of the sender bundle 142. A converging lens 162 focuses light projected by the sender fibers 152 preferably at a point a short distance before the dots 113, 113 and the surface of the sidewall 110 so that light reflected from the sidewall 110 and the dots 113, 113 is not reflected directly back into the sender fibers 152, 152. Also, this lens design minimizes the amount of light reflected by the inner surface of the sidewall 110 back to the scanning head 122. As illustrated by arrows 179 and 181 in FIGS. 2(a) and (b), respectively, the light transmitted through the sender fibers 142, 142 proceeds approximately normal or perpendicular to the container sidewall 110. The height of the transmitted column is greater than the diameter of the dots 113, 113 to accommodate vertical misalignment between the optical scanning head 122 and the dots 113, 113. When a portion 173 (FIG. 1) of the container sidewall 110 devoid of a dot 113 is exposed to the transmitted light, a detectable amount, for example five percent, reflects back toward the scanning head 122 in a direction approximately parallel to the direction of the incident light as illustrated by arrows 174, 174 in FIG. 2(b). This light is focused by the lens 162 and received in the receiver fibers 154, 154. It should be noted that of the five percent return, approximately four percent results from reflections from the outer surface of the container sidewall 110 and approximately one percent results from reflections from the inner surface of the container sidewall.

Figure 2B:
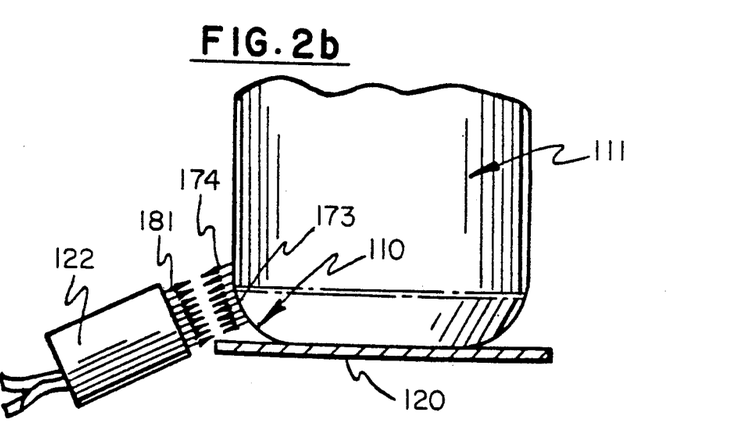
FIG. 2(b) shows a fragmentary view of the scanning head of FIG. 2(a) and the bottle of FIG. 2(a) turned 90° about its axis to expose a portion of the bottle sidewall to the scanning head.

The light received within the receiver fibers 154, 154 illuminates a photoreceptor diode 170 and represents a high level of reflection received by the scanning head 122 as illustrated by the number of arrows 174, 174 of FIG. 2(b) which aim toward the scanning head 122. However, when the bottle is rotated to the orientation of FIG. 2(a) such that one of the dots 113 is positioned within the field of the scanning head 122, much of the light projected toward the dot 113 is reflected at an appreciable angle or scattered relative to the angle of the incident light as illustrated by arrows 175, 175 so that little of this reflected light proceeds toward the lens 162 and the receiver fibers 144, 144. Due to the relatively large cross-sectional length of the composite light beam projected by the sender fibers 142, the projected light also strikes regions of the container sidewall 110 above and below the dot 113 as illustrated in FIG. 1 and arrows 177, 177 of FIG. 2(a) and this yields a reflection which proceeds toward the scanning head 122 and the receiver fibers 144. However, the collective intensity of the light reflected from the region 176 including the dot 113 and the regions above and below is less, for example thirty percent, than the intensity of the light reflected from the region 173 of the container sidewall 110 which is devoid of any dot 113.

Figure 4:
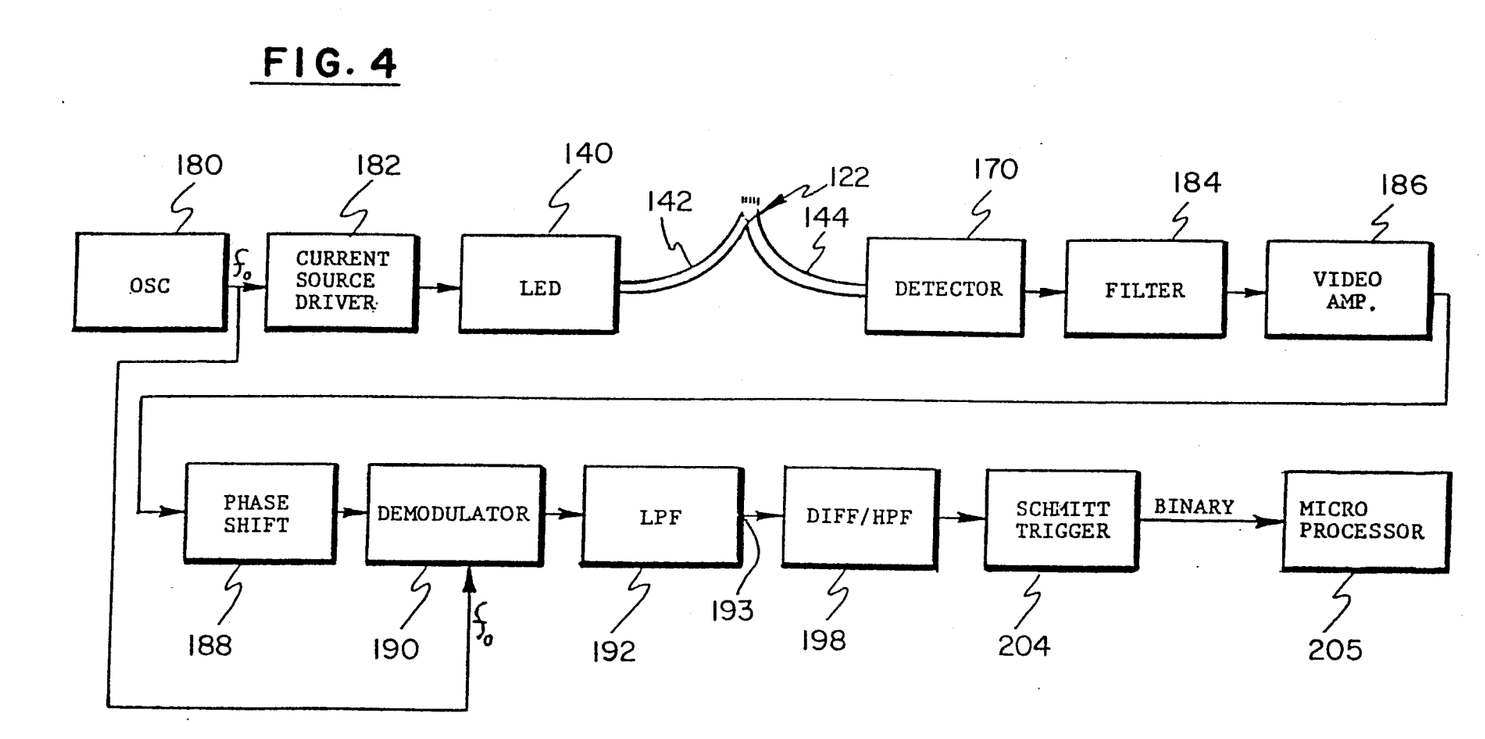
FIG. 4 is a block diagram illustrating circuitry within the electronic control of FIG. 2(a).

FIG. 4 illustrates circuitry within the electronic control 124 which drives the LED 140 and processes the signals produced by the photoreceptor diode 170. An oscillator 180, for example set at 500 kilohertz, supplies a sinusoidal wave form to a current driver 182 which squares-up the sign wave and supplies a corresponding drive current to the LED 140 causing the LED to flash at the corresponding frequency. The LED 142 supplies light to all of the sender fibers 152, 152 within the sender bundle 142 simultaneously.

Light received by the receiver fibers 154, 154 collectively illuminates the photoreceptor diode 170 which produces a signal (conductivity) proportional to the intensity of the light. The signal has a carrier frequency equal to the frequency of the oscillator 180 and the intensity is modulated by the variations in reflection intensity caused by the dots as they sequentially pass by the scanning head 122. The modulation frequency depends on the speed of rotation of the bottle 111 and the diameter and spacing of the dots.

Figures 5A, 5B:
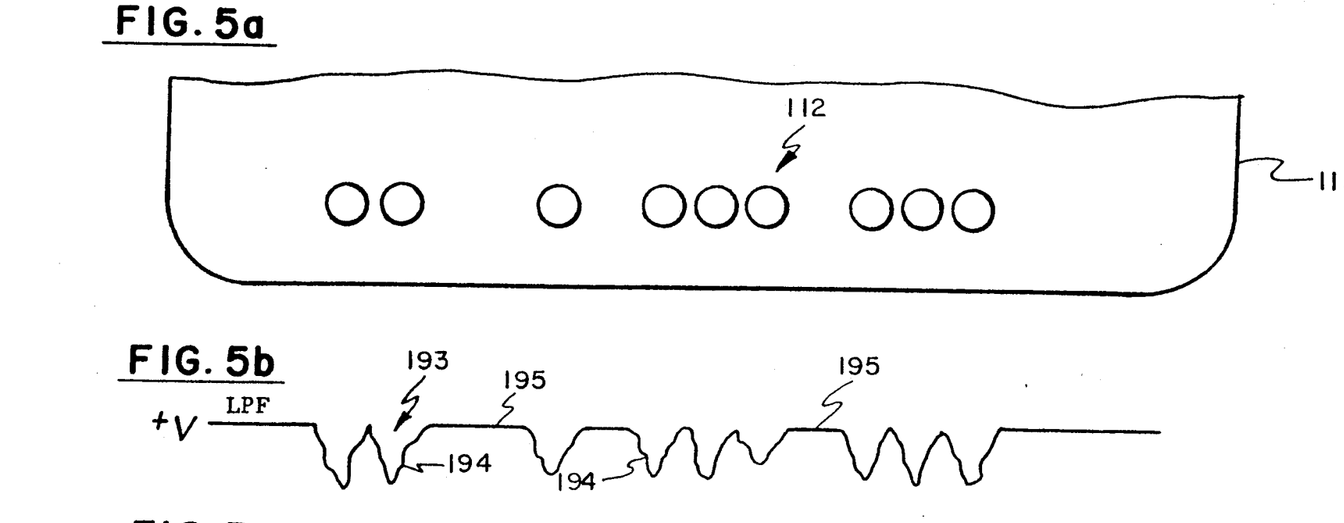

The photoreceptor signal is supplied to a preamplifier which contains a filter 184 tuned at the oscillator 180 frequency to reduce the noise and a tuned amplifier 186. The filter 184 imparts a phase shift to the signal so the output of the tuned amplifier 186 is supplied to a video amplifier 188 which includes phase shifting circuitry to correct the phase to correspond to that of the oscillator 180. The output of the amplifier 188 is then applied to a balanced demodulator 190 which, by way of example, comprises a multiplier having one input connected to the output of the video amplifier 188 and another input connected to the output of the oscillator 180. Consequently, the output of the balanced demodulator 190 is the modulation signal and another, much higher frequency signal (a frequency approximately twice that of the oscillator 180). The higher frequency signal is filtered by a low pass filter 192 and an output 193 of the low pass filter 192 is illustrated in FIG. 5(b). Valleys 194, 194 of the wave form 193 correspond to the relatively low intensity or absence of light received by the scanning head 122 when one of the dots 113 is located within the field of the scanning head and scatters the incident light, and plains 195, 195 of the wave form 193 correspond to the relatively high intensity of the light reflected from the container sidewall 110 when no dot 113 is within the field of the scanning head 122.

Figure 5C:
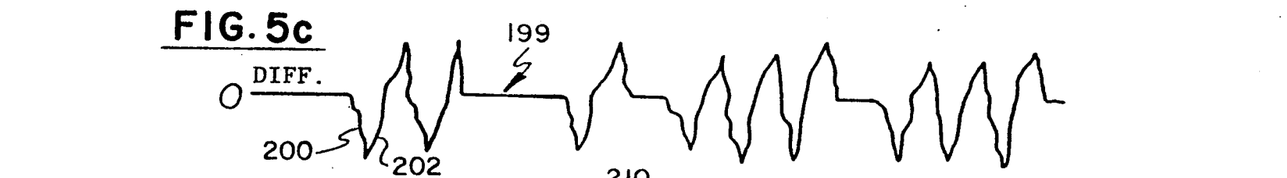
Figure 5D:
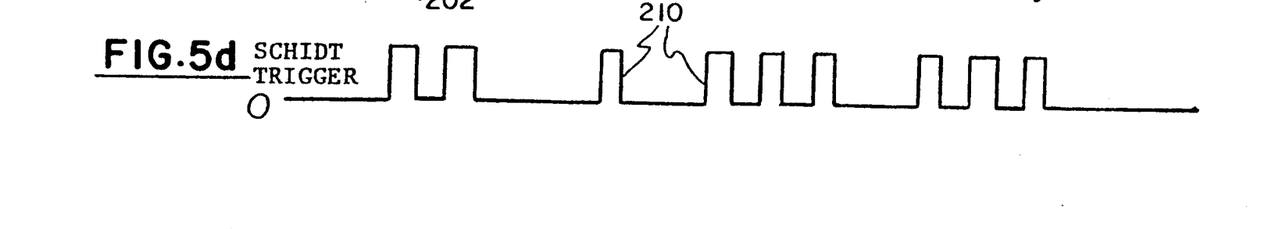

The output of the low pass filter 192 is supplied to a differentiator or matched high pass filter 198 to yield a wave form 199 shown in FIG. 5(c). FIG. 5(c) illustrates that the falling portion of each valley 194 yields a relatively sharp falling portion 200 of the differentiated signal 199 and the rising portion of each valley 194 yields a relatively sharp rising portion 202 of the differentiated wave form. The output 199 of the differentiator 198 is supplied to a Schmidt trigger 204 which is set to trigger to its binary one state 210 at a voltage level approximately half the average peak negative voltage of the differentiated signal 199 corresponding to the dots 113, 113 and to reset itself to the binary zero level at approximately zero volts as illustrated in FIG. 5(d). Consequently, FIG. 5(d) provides a clear binary representation of the dot code elements 113, 113 of the dot code 112 in accordance with the objects of the invention. Digital processing techniques utilizing an optional microprocessor 205 are currently known to extract the information from the code 112 which information is based on the location of the middle five binary one level pulses 210, 210.

It should be noted that if desired, the output of the low pass filter 192 may be fed directly into the Schmidt trigger 204 to provide the binary wave form of FIG. 5(d). Whether or not the differentiator 198 or other such processing circuitry is included depends on the particular application of the scanning head 122 and the types of bottle noise due to seams and lettering and other noise presented by the particular types of bottles being scanned and the surrounding environment.

Figure 6:
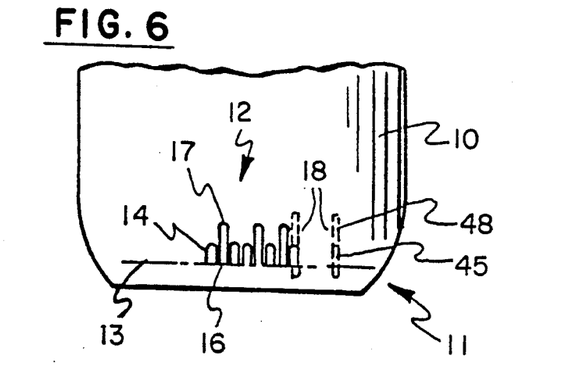
FIG. 6 is a side elevational view of the lower part of a glass container having a bar code molded into its sidewall.
Figure 7:
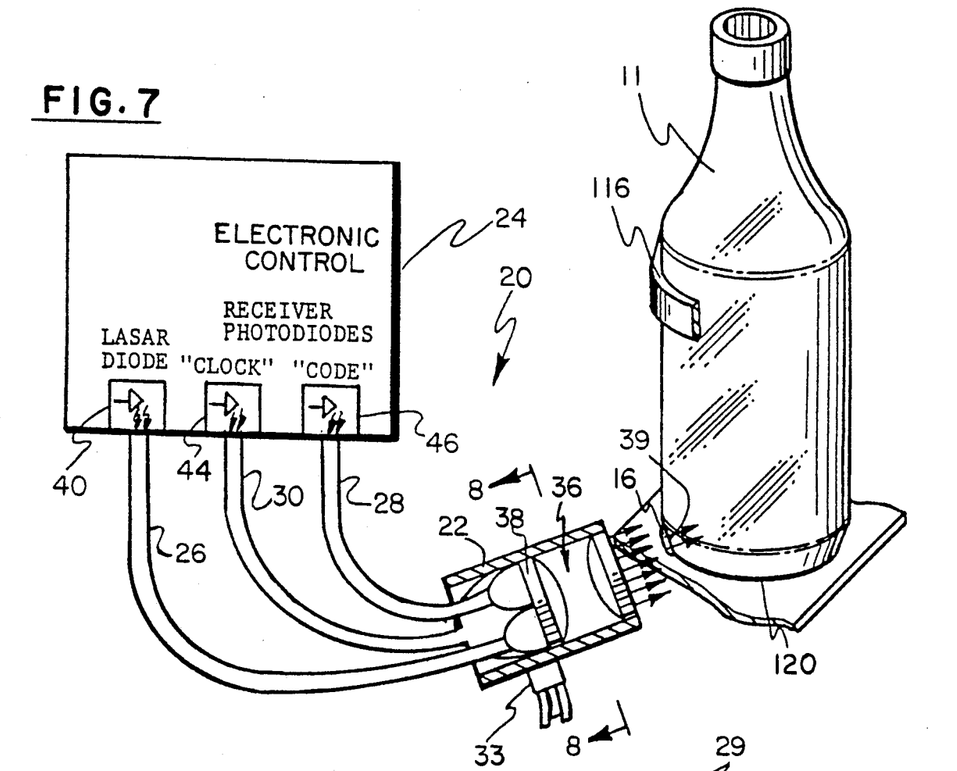
FIG. 7 shows a side elevational view of the container of FIG. 1 turned 90° about its axis, and a schematic view of a scanning head and an associated electronic control for reading the dot code.

Turning now to a second embodiment and application of the invention, FIG. 6 illustrates a bar code 12 located on a sidewall 10 of a glass container 11. The bar code comprises shorter elements 14, 14 and longer elements 16, 16 which are substantially parallel to and uniformly spaced from one another. The elements 14 and 16 are also registered along an imaginary baseline 13. Each of the bar elements 14 and 16 protrudes outwardly from the sidewall 11 and is shaped in the form of an optical reflector. By way of example, the longitudinal sides of the bar elements are either rounded to form a semi-circular cross-section or flat to form a tent shaped cross-section or some shaped intermediary configuration. FIG. 7 illustrates a side view of one of the protruding bar elements 16.

The lengths of the bar elements 14 and 16 indicate respective binary levels and the code 12 provides up to eight bits of information. As discussed in more detail later, the shorter elements 14, 14 and the bottom half of each longer element 16 serve as timing marks to indicate the location of a bar or bit of information, the top portion of each of the longer bar elements 16 indicate one binary level and the container sidewall region above each of the shorter elements 14, 14 indicates the other binary level.

FIG. 7 also illustrates a code element reading apparatus generally designated 20 in which the second embodiment of the invention is embodied. The code element reading apparatus 20 comprises a code reading head 22 and an electronic control 24, and is shown reading the code 12 on the bottle. The bottle 10 is supported on the base 120 at the scanning site adjacent to the scanning head 22, and during scanning, is rotated by the belt 116 to expose each of the code elements 14, 16 in sequence to the optical scanning head 22. The speed of rotation is either predetermined or monitored by the electronic control 24. The scanning head 22 is supported by a bracket 33 normal to the exposed code element at the inspection site.

Figure 8:
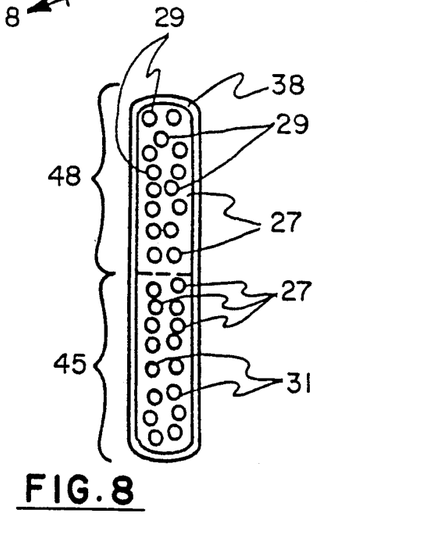
FIG. 8 is a cross-sectional view of the scanning head of FIG. 7 taken on the plane 8—8 and illustrates optical fibers within the scanning head.

The scanning head 22 comprises a bundle 26 of sender optical fibers 27, 27, a bundle 30 of receiver clock optical fibers 31, 31 and a bundle 28 of receiver code optical fibers 29 (see FIGS. 7 and 8). A rim 38 supports exposed ends of the optical fibers 27, 29, 31 within the bundles 26, 28 and 30, and a pair of plano convex lenses 36 focuses light to and from the optical fibers. Both the axes of the plano convex lenses 36 and the optical fibers within the rim 38 are approximately normal to the exposed code element 16. As illustrated in FIG. 8, half of the exposed fibers within the rim 38 eminent from the sender bundle 26 and are distributed randomly over the entire length of the rim 38 so that light provided by an LED 40 (FIG. 7) is received by the sender optical fibers 27, 27 and projected over a region 18 (FIG. 6) which is longer than the length of the code elements 16, 16. The extra length accommodates longitudinal misalignment between the code elements and the scanning head 22.

Common ends of the clock optical fibers 27, 27 are randomly distributed within a lower half 45 of the rim 38 and are normal to the bottom half of each longer element 16 and to each entire shorter element 14 when the respective code element is aligned with the scanning head 22. The opposite ends of the clock optical fibers 31, 31 aim at a code photodiode 46.

Common ends of the code optical fibers 29, 29 are randomly distributed within an upper half 48 of the rim 38 and are normal to the top half of each longer code element 16 and to a region on the bottle sidewall 10 above each shorter code element when the respective code element is aligned with the scanning head 22. The opposite ends of the code fibers 29, 29 aim at a code photodiode 46.

The lens 36 is focused just before the exposed code element for reasons discussed above. When a code element is not within the field of the lenses 36, light emitted by the LED 40 projects onto the container sidewall 10 and a detectable amount, for example five percent, is reflected off the sidewall back through the lens 36 and into the entire code and clock receiver fibers 29, 31.

The resultant signals produced by the photodiodes 44 and 46 are processed by the electronic control 24 as discussed below. When the bottle 10 is rotated such that one of the longer code elements 16 is positioned in front of the scanning head 22, much of the light transmitted by the LED 40 via the bundle 26 reflects laterally off the curved or angled sides of the code element 16 away from the scanning head 22 as indicated by arrows 39, 39 so that relatively little light (approximately two percent) reflects back to the optical fibers 29 or 31. When the bottle 11 is further rotated such that one of the smaller code elements 14 is positioned in front of the scanning head 22, light emitted by the LED 40 is projected onto the code element 14 and onto a region on the sidewall 10 above it. Much of the light which illuminates the code element 14 is reflected laterally from the sides of the code element so that relatively little light (approximately two percent) reflects back to the clock fibers 31, 31, while much of the light which illuminates the sidewall region is reflected normally and into the code fibers 29, 29 (approximately five percent). Because the clock optical fibers 31, 31 are distributed in the lower portion 45 of the rim 38 and are normal to the code element 14, they receive relatively little of the light reflected from the sidewall portion. As the bottle 11 is rotated further, the other code elements 14, 16, the sidewall regions between them and the sidewall regions above the shorter elements 14, 14 are sequentially illuminated by the LED 40 and scanned.

Figure 9:
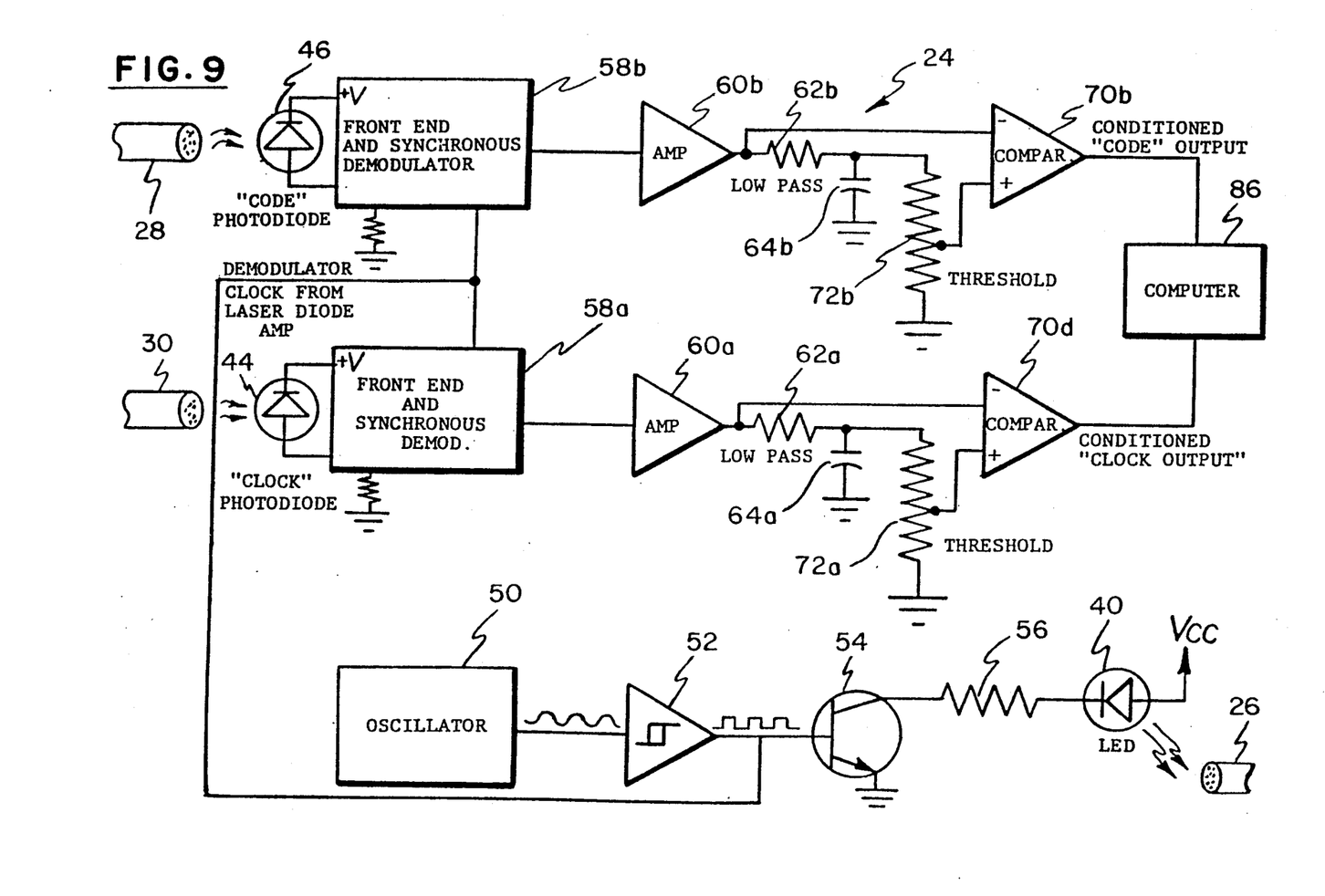
FIG. 9 is a block diagram illustrating electronic circuitry within the electronic control of FIG. 7 for processing signals obtained from the scanning head and translating them into a binary representation of the bar code.

FIG. 9 illustrates the LED 40 and modulation circuitry which drives it. The modulation circuitry comprises an oscillator 50 which, by way of example, produces a 500 kilohertz sinusoidal wave form, a gate 52 to square up the sinusoid, for example, a Schmidt trigger, and a transistor 54 which interfaces to the LED 40 via a current limiting resistor 56. As described above, as the bottle 11 rotates, the intensity of the reflected light is modulated by the differences in normal reflectivity between the container sidewall and the code elements.

Figure 10A:
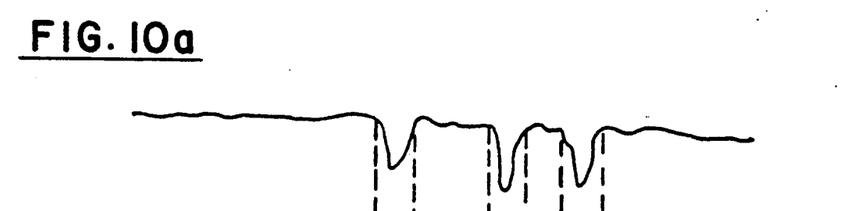
Figure 10B:
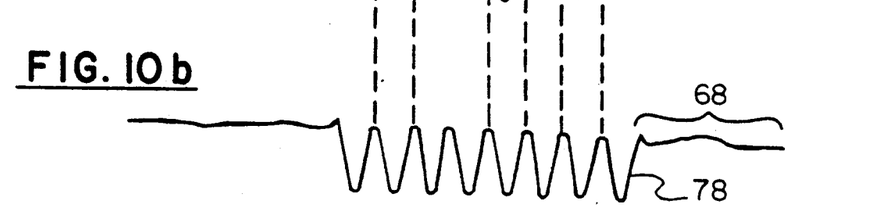

The clock photodiode 44 is connected to a front end and synchronous demodulator circuit 58a, the front end portion including an amplifier and the demodulator including a multiplier as described above. The output of the circuit 58a is amplified by an amplifier 60a and a clock signal amplifier output is illustrated in FIG. 10(b). During a first portion 68 of the clock signal wave form, the code 12 was not positioned in front of the scanning head 22 so that the clock optical fibers 31, 31 receive a significant amount of light reflected normal from the container surface, which light level, for example corresponds to approximately 2.5 volts at the output of the amplifier 60a.

Figure 10C:
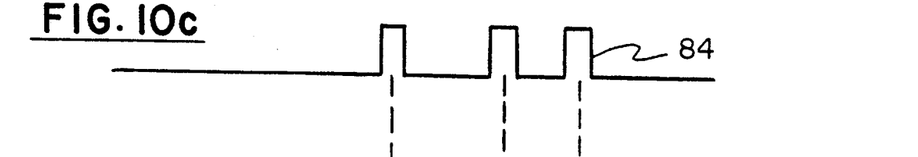
Figure 10D:
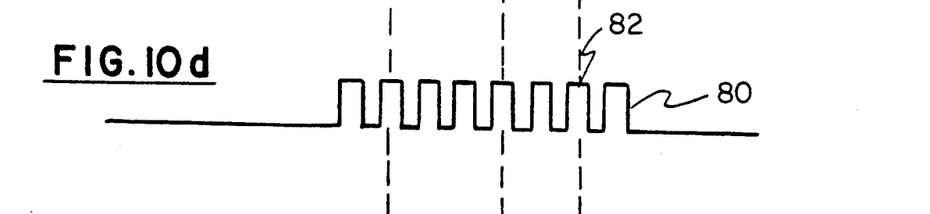

The output of the amplifier 60a is also passed through a low pass filter comprising a series resistor 62a and a parallel capacitor 64a which removes virtually all of the AC component of the clock signal leaving the 2.5 volt D.C. This D.C. voltage varies with changes in bottle type and color and ambient conditions. Then the output of the low pass filter is divided by a potentiometer 72a to form a threshold level and supplied to the positive input of the comparator 70a. This threshold level also varies due to changes in container reflectivity and ambient conditions and therefore, automatically adjusts itself to a proper level to distinguish the relatively high reflections from the container sidewall from the relatively low reflections when a code element is aligned with the optical scanning head. In the illustrated example, when the output of the amplifier 60a due to reflections from the non-coded container surface is approximately 2.5 volts, the threshold is set to approximately 1.75 volts and as a result, as indicated by FIG. 10(d), the comparator output zero volts when the optical scanning head faces the non-coded container surface.

Figure 10E:
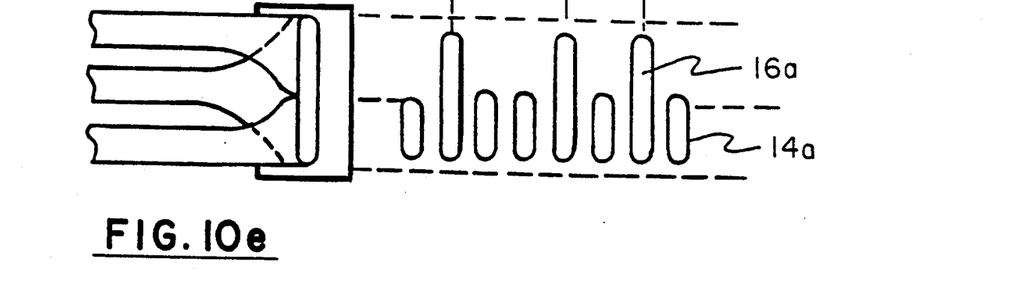

When a short code element 14a illustrated in FIG. 10(e) is aligned with the clock fibers, the light projected by the sender fibers 27,27 strikes the code element 14a and is reflected at an appreciable angle relative to the normal so that very little reflected light is received by the clock receiver fibers 31, 31. Consequently, as illustrated by a portion 78 of FIG. 10(b), relatively little light is projected onto the clock photodiode 44 and the resultant output of the amplifier 60(a) is relatively low, in the illustrated embodiment, approximately one volt. The threshold level applied to the positive input of the comparator 70a is affected little by the temporary dip in the amplifier 60a output so that the threshold level remains approximately 1.75 volts and the output of the comparator 70a provides a positive going pulse 80 having a width corresponding to approximately the time it takes for the code element 14a to rotate past the field of the lens 36 and clock fibers.

It should be noted that while the code element 14a is within the field of the clock fibers, light is also being projected by the sender fibers to the region on the container surface immediately above the code element 14a which light is reflected approximately normal to the surface of the container, received by the code receiver fibers and projected onto the code photodiode 46. The response of the code photodiode 46 is processed in the same manner as the response of the clock photodiode 44 by a front end and demodulator 58b, an amplifier 60b, a series resistor 62b, a parallel capacitor 64b, a potentiometer 72b and a comparator 70b as illustrated in FIG. 9. While the scanning head 22 is scanning the code element 14a, the output of the amplifier 60b is at the relatively high level and the comparator 70b exhibits the low level as shown in FIG. 4(c).

Next, the optical scanning head 22 scans a region between the first code element 14a and the second code element 16a so that both receiver bundles 28 and 30 receive the relatively high level of reflections from the intervening container surface and the outputs of the amplifiers 60a and b rise to the 2.5 voltage, high level.

Next, the container 11 is rotated such that the long bar element 16a is positioned in front of the scanning head 22. Because the bottom portion of the bar element 16a is aligned with the clock receiver fibers 31, 31, the comparator 70a produces a corresponding pulse 82 at its output as illustrated in FIG. 10(d) and because the code receiver fibers 29, 29 are aligned with the top portion of the bar code element 16a, the comparator 70b produces a pulse 84 as illustrated in FIG. 10(c). As the container 11 is further rotated, each of the code elements is scanned in sequence yielding the binary wave forms illustrated in FIGS. 10(a-d) in accordance with object of the invention.

The binary outputs of the comparators 70a and 70b are supplied to a computer 86 which is programmed to read the output of the comparator 70b during each pulse produced by the comparator 70a. If desired, the computer 86 may be further programmed with an algorithm to distinguish the clock pulses of the comparator 70a from pulses caused by other irregularities on the container sidewall at the level of the code such as lettering, seams, or bump defects. Such an algorithm for locating the code is disclosed in U.S. patent application Ser. No. 876,038 filed by Joseph A. Kulikauskas on June 19, 1986 for "Selective Code Reader" which patent application is incorporated by reference as part of the present disclosure.

Figure 11:
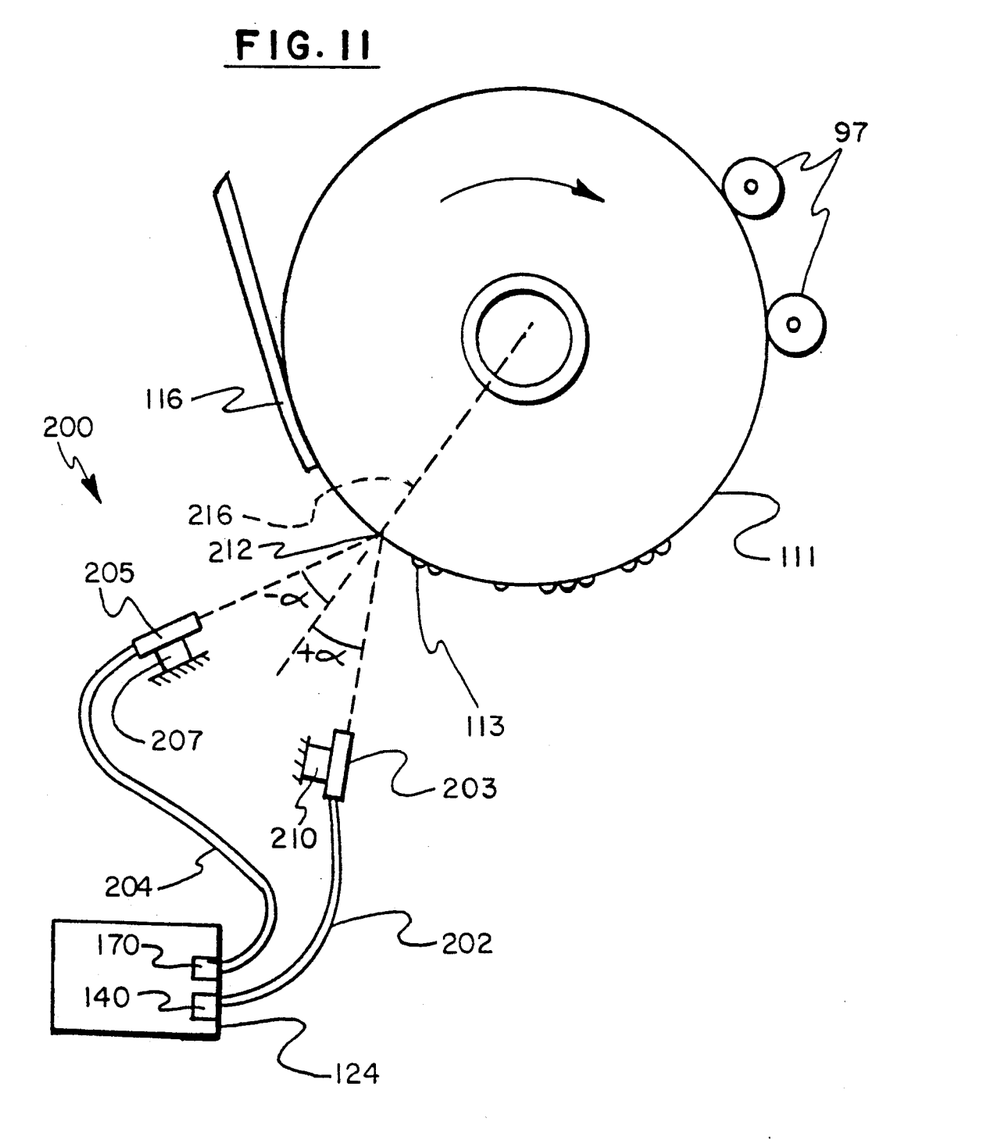
FIG. 11 is a schematic top view of the container of FIG. 1 and code reading apparatus of another embodiment of the invention.

FIG. 11 schematically illustrates optical scanning apparatus generally designated 200 comprising another embodiment of the invention. The apparatus 200 comprises the electronic control 124, the light emitting diode 140 and the photodetector 170 of the embodiment of FIG. 2(a). The electronic control 124 of the apparatus 200 drives the LED 140 and processes output signals of the photodetector 170 in the same manner as in the embodiment of FIG. 2(a). In addition, a bundle 202 of optical sender fibers is connected between the light emitting diode 140 and a rim and lens assembly 203. The assembly 203 is supported by a bracket 210 to project light toward a region 212 on the container surface at an angle alpha relative to a bottle radius 216 of the region 212. The region 212 has a rectangular cross-section similar to the regions 173 and 176 of FIG. 1. When no code elements are located in the region 212, the light projected by the sender bundle 202 reflects at a natural angle of minus alpha relative to the radius 216 (or twice alpha relative to the incident light).

A bundle 204 of optical receiving fibers is connected between the photodiode 170 and a rim and lens assembly 205 and aims at the angle minus alpha at the region 212 so that when no code element is located in the region 212, the light projected by the sender bundle 202 is reflected by the container sidewall and into the receiver bundle 204. However, when a code element is located within the region 212, the light projected by the sender bundle 202 is scattered at an appreciable angle relative to the angle minus alpha so that relatively little light is received by the receiver bundle 204. Consequently, the receiver bundle 204 and photodetector 170 detect the absence of light (as does the receiver bundle 144 and photodetector 170 in the embodiment of FIG. 2(a)).

By the foregoing, optical scanning heads and code reading apparatus and processes embodying the present invention have been disclosed. However, numerous substitutions and modifications may be made without deviating from the scope of the invention. For example, if desired one or more light emitting diode may be positioned within the scanning head 22 to illuminate the code 12 and adjacent portions of the container surface instead of utilizing the sender fibers 27, 27 or 152, 152. Also, two or more photodiodes may be positioned adjacent to the light emitting diode to receive reflections which are approximately normal to the container surface instead of the code and clock receiver fibers 29, 31 in the bar code embodiment, and one or more photodiode may be positioned adjacent to the light emitting diode to receive light reflected normally from the container surface instead of the code fibers 154, 154 in the dot code embodiment.

Also, if desired, the length of the rim 160 and corresponding field of light may be made equal or less than the diameter of the dots so that the intensity of reflections received by the receiver fibers 154 is very small when scanning a dot compared to the intensity received when scanning the container sidewall. Similarly, if desired, the length of the rim 38 may be made equal or smaller than the length of the longer code elements 16, 16 and the length of the portion 45 may be made equal or smaller than the length of the shorter code elements 14, 14.

Also, if desired the LED in either the bar code or dot code embodiment may take the form of a laser diode or be operated in a continuous mode instead of the pulsed mode described above. Therefore, the invention has been disclosed by way of illustration and not limitation and reference should be made to the claims to determine the scope of the invention.

What is claimed is:

1. A mold number reader for determining the mold of an individual section glass forming machine having a plurality of molds in which a transparent glass bottle was made, the glass bottle having been made with a mold number code in the form of bump like projections located along an annular smooth curved bottom surface band extending around the glass bottle to identify the mold in which it was made comprising means for rotatively displacing the glass bottle, as it is supported vertically, so that the smooth surface band which extends horizontally around the glass bottle will be scanned past a selected location, means for illuminating a portion of the annular surface band from a location above the bump like projections to a location below the bump like projections including, light source means, a plurality of parallel optical sender fibers for receiving light from said light source means and for dispersively distributing light, lens means spaced from the glass bottle for redirecting the dispersing light distributed from each fiber and focusing said light at a point proximate the surface of the glass bottle to maximize the amount of light striking the annular surface band so that the percentage of light reflected from the surface of the transparent bottle can be maximized to about five percent of the striking light, a plurality of parallel optical receiving fibers randomly located around said sender fibers, said lens means further comprising means for redirecting light reflected from the annular surface band to said receiver fibers, the bump like projections preventing the reflection of the focused lights of a sender fiber which strikes the bump like projections back to said lens means and light detector means for distinguishing the level of light reflected from a bump from the level of light reflected from a bump free portion of the annular surface band.

2. A mold number reader according to claim 1, wherein said light source means comprises a high intensity LED.

3. A mold number reader according to claim 1, wherein said light detector means comprises a photoreceptor diode.

* * * * *